Aug. 30, 1932.   R. E. EINSTEIN   1,874,001
RAIL LUBRICATING APPARATUS
Filed Aug. 12, 1929   2 Sheets-Sheet 2
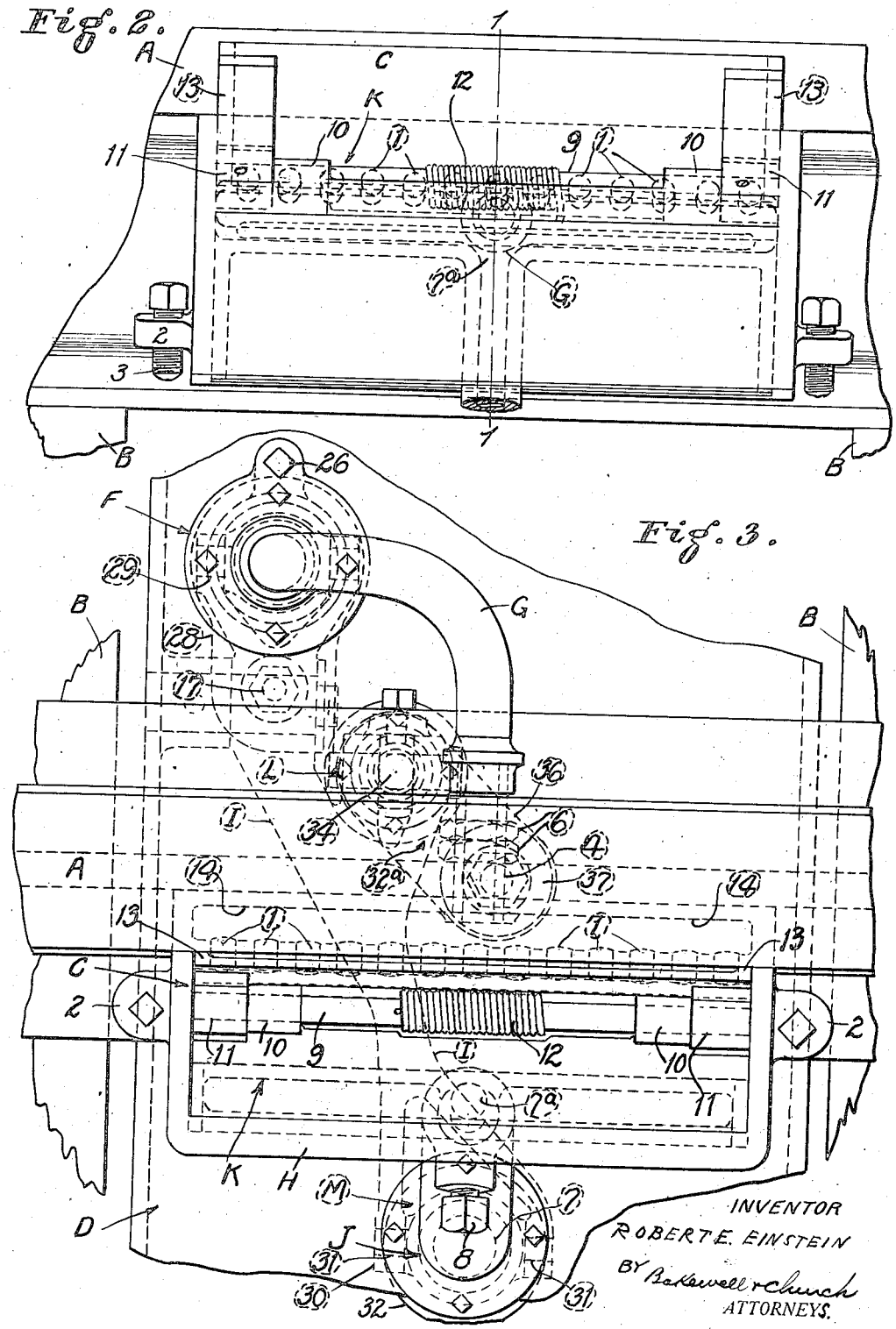

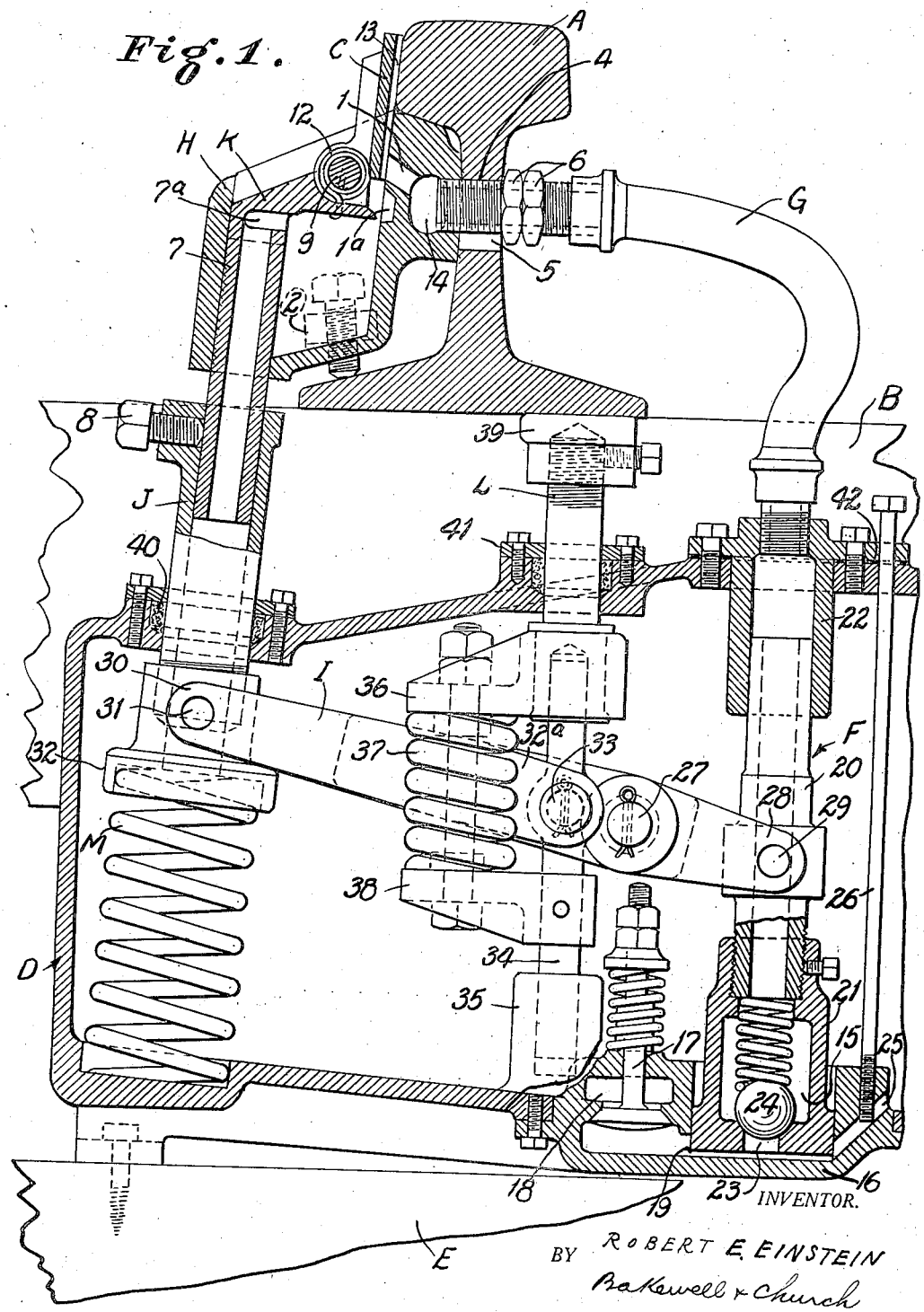

Patented Aug. 30, 1932

1,874,001

UNITED STATES PATENT OFFICE

ROBERT E. EINSTEIN, OF ST. LOUIS, MISSOURI

RAIL LUBRICATING APPARATUS

Application filed August 12, 1929. Serial No. 385,254.

This invention relates to a rail lubricating apparatus of the type that have provision for automatically applying a lubricant to the inner side of the head of a rail, so as to lubricate the rail and the flange of a passing wheel, and thus reduce friction and wear on curves.

One object of the invention is to provide an automatic rail lubricating apparatus of the general type mentioned, which is of such design that it will apply the lubricant effectively, economically and without liability of the lubricant being splashed or thrown over the parts of the apparatus adjacent the lubricating device.

Another object is to provide an automatic rail lubricating apparatus which is of such design that water, dirt or other foreign matter cannot enter the lubricant reservoir of the apparatus.

Another object is to provide an efficient rail lubricating apparatus of simple design, that is inexpensive to construct, easy to install and reliable in operation.

And still another object is to provide an automatic rail lubricating device, which, in addition to having the desirable features above mentioned, is capable of being adjusted to adapt it to different sizes of rails; to regulate the supply of the lubricant to the lubricant applying device; and to compensate for wear.

The objects above referred to are attained by the lubricating apparatus herein illustrated, which comprises a lubricant applying device located on the gage side of the rail between two track ties and disposed parallel to the rail, and a mechanism that operates automatically incident to the passing of a car wheel over the rail and causes a lubricant to be supplied to or fed to said lubricant applying device and thereafter spread over the gage side of the head of the rail. The mechanism just referred to will usually comprise a pump for feeding the lubricant under pressure from a source of supply to the lubricant applying device, an operating member for moving the lubricant applying device relatively to the rail head, and a means operated by the movement of the rail, either upwardly or downwardly, for actuating said pump and said operating member. Preferably, the lubricant applying device is so arranged that it extends normally alongside the rail head and the operating mechanism is so constructed that the deflection of the rail, produced by an approaching car wheel, imparts movement to said mechanism in a direction to depress the lubricant applying device into a position where it will not be engaged by the flange of the wheel, and the return movement of said mechanism, after the wheel has passed the apparatus, restores the lubricant applying device to its normal position and imparts a power stroke to the lubricant pump, so as to cause a charge of the lubricant to be fed under pressure to the lubricant applying device. It is not essential, however, that the apparatus comprise parts of the particular kind and arrangement above described, and when the apparatus is composed of parts of the kind above referred to, it is not necessary that said parts be constructed in the particular manner herein illustrated, although I prefer to construct the apparatus in the way illustrated in the drawings, as such an apparatus is inexpensive to build, easy to install and easy to maintain in operative condition.

Figure 1 of the drawings is a vertical transverse sectional view of a rail lubricating apparatus embodying the invention.

Figure 2 is a side elevational view of said apparatus; and

Figure 3 is a top plan view of said apparatus.

Referring to the drawings which illustrate the preferred form of the invention, A designates the rail with which the apparatus is used, usually a rail located in a curved portion of a track, and B designates two of the track ties on which the rail rests. The lubricating apparatus comprises a lubricant applying device C which normally extends along the gage side of the head of the rail, as shown in Figure 1, a reservoir D positioned under the rail between the ties B and sustained by a sleeper or other suitable supporting means E, a pump, designated as an entirety in Figure 1 by the reference character F, for feeding charges of lubricant under pressure from the reservoir D through a conduit G that leads to distributing ports 1 in the guide member H in which the lubricant applying device C reciprocates vertically, a lever or other suitable operating member I arranged in the reservoir D and having its opposite ends operatively connected with the plunger of the pump F and with a reciprocating element J attached to a carrier K on which the lubricant applying device is mounted, and an actuator L arranged under the base flange of the rail and adapted to be moved downwardly by the deflection of the rail for imparting movement to the lever I in one direction. A spring M, which is interposed between the bottom of the lubricant reservoir and the lower end of the reciprocating element J which actuates the carrier K for the lubricant applying device, restores the lever I to the position shown in Figure 1 after said lever has been actuated by the deflection of the rail, produced by a passing car wheel, which movement of the lever I is preferably utilized to impart a power stroke to the plunger of the pump F, and thus cause a charge of lubricant to be fed to the lubricant applying device C.

The guide member H, in which the lubricant applying device is reciprocatingly mounted, is herein illustrated as consisting of a casting of box shape in general outline, that is adapted to be positioned between the head and the base flange of the rail, and clamped to or held in operative position on the same in any suitable way. Usually, the member H will be provided at its upper end with a portion that is adapted to bear against the underside of the head of the rail, and it will be provided at its lower end with laterally-projecting lugs 2, shown in Figure 2, that are equipped with set screws or equivalent devices that can be moved downwardly into engagement with the base flange of the rail, so as to clamp the member H to the rail. Said member H is prevented from moving laterally away from the web of the rail by a nipple 4 on the inner side of said member that projects through a hole 5 in the web of the rail, nuts 6 being mounted on said nipple so as to hold the inner side of the guide member H in snug engagement with the web of the rail. This method of constructing the guide member H and holding it in operative position on the rail makes it possible to use said member with rails of various weights or sizes, in which the distance between the head and the base flange of the rail varies. As shown in the drawings, the guide member H is of substantially box shape in general outline and its upper end is open.

The carrier K for the lubricant applying device is arranged horizontally in the guide member H, and conforms in outline and dimensions to the internal space of the guide member H formed by the upright walls of same, there being sufficient clearance between the peripheral edge of the carrier K and the upright walls of the guide member H to permit said carrier to move freely upwardly and downwardly. At the front side of the carrier K is a depending tubular portion 7 that projects downwardly through a hole in the bottom wall of the internal space of the guide member H, which tubular portion 7 is adjustably connected at its lower end by means of a set screw 8 or the like to the reciprocating element J, previously referred to.

The lubricant applying device C consists of an oblong-shaped, plate-like member that is arranged horizontally at one side of the rail, and disposed vertically or edgewise with its inner face in opposed relationship to the gage side of the rail head. Said device C is connected to the carrier K by a horizontally-disposed pintle or pivot pin 9 that extends horizontally through lugs 10 on the carrier and lugs 11 on the end portions of the lubricant applying device. A torsion spring 12, which is mounted on the pintle pin 9, with one end of said spring connected to the carrier K and with the other end of said spring connected to the pintle pin 9, exerts pressure on the pintle pin in a direction to force the free end or top edge of the lubricant applying device C inwardly towards the rail, the lugs 11 on the device C being attached to the pintle pin 9. The guide member H is so designed that when said member is arranged in operative position on the rail, the inner surface of the rear wall of said member will virtually form a continuation of the gage side of the head of the rail, as shown clearly in Figure 1. In order that the lubricant applying device C will slide freely over the said inner wall of the guide member H and over the gage side of the rail head when the apparatus is in use, and in order that the device C will be maintained in such relationship with the guide member H as to permit the lubricant to be applied to the inner surface or side of the device C, said device C is provided at its ends with guide ribs 13 which prevents said device from touching upon or bearing upon the gage side of the head of the rail throughout the entire length of said device C when said device is in its elevated position. The nipple 4, previously referred to, is also used to connect the conduit G with a manifold chamber 14 in the guide member H from which the distributing ports 1 lead. The outer ends of said distributing ports terminate in the surface of the inner wall of the guide member H over which the lubricant applying device C slides when said device is raised and lowered, as hereinafter described. At a point below the distributing ports 1, a horizontally-disposed by-pass groove 1ᵃ is formed in the guide member H, so as to permit excess lubricant from the device C to flow downwardly and collect in the internal space of the guide member H. During the downward movement of the carrier K on which the lubricant applying device is mounted, the excess lubricant that is collected in the internal space of the guide member H escapes from said space into a port 7ª in the upper end of the tubular portion 7 of the carrier and then flows downwardly through said tubular portion and through a center bore of the reciprocating element J from which it discharges into the lubricant reservoir D.

The pump F in the lubricant reservoir is provided with a cylinder 15 formed preferably in a casting 16 that is set in an opening in the bottom of the lubricant reservoir, said casting being provided with a spring-pressed inlet valve 17 that normally cuts off communication between the inlet port 18 of the valve casing and the inlet port 19 of the pump cylinder. The plunger 20 of the pump is hollow and is provided at its lower end with a hollow piston portion 21 that reciprocates in the cylinder 15. As shown in Figure 1, the upper end portion of the pump plunger 20 fits in a guide 22 mounted on the top wall of the lubricant reservoir, and the piston portion 21 at the lower end of the pump plunger is provided with an inlet port 23 that is normally closed by a spring-seated check valve 24. When the lever I moves in a direction to move the pump plunger 20 upwardly, the suction created in the cylinder 15 by the upward movement of the piston portion 21 on the pump plunger causes a charge of lubricant to be drawn into said cylinder, past the inlet valve 17 of the pump, and on the succeeding downward stroke of the pump plunger, the check valve 24 opens and permits said charge to escape upwardly through the pump plunger, and thence through the conduit G to the manifold groove 14 from which said lubricant escapes through the distributing ports 1 to the inner face of the lubricant applying device C that is arranged in opposed relationship to the gage side of the rail head. In order that the quantity of the lubricant that is supplied to the device C may be accurately regulated, the pump is provided with a leak port 25 leading from the cylinder 15, and an adjustable valve 26 for regulating the effective area of the leak port 25. If it is desired to feed a relatively great charge of lubricant to the lubricant applying device C, the valve 26 is adjusted into its closed or nearly closed position, so that on the downward stroke of the plunger of the pump F the entire charge of lubricant that has been drawn into the cylinder of said pump will be displaced from same and forced upwardly through the pump plunger and conduit G to the distributing ports 1. If it is desired to feed only a relatively small charge of lubricant to the device C, the valve 26 is adjusted so as to permit some of the lubricant which has been drawn into the pump cylinder 15 to escape from same back into the lubricant reservoir through the leak port 25 when the pump plunger 20 moves downwardly.

The lever I, previously referred to, that is used to actuate the pump F, and the reciprocating element J to which the carrier K of the lubricant applying device is attached, is pivotally mounted on the stud or trunnion 27 inside of the lubricant reservoir D, and is provided at its right hand end with a forked or bifurcated portion 28 that is connected by means of a pivot pin 29 to the pump plunger 20. At the left hand end of said lever I is a bifurcated portion 30 that is connected by a pivot pin 31 to a spring seat member 32 on the lower end of the reciprocating element J. Intermediate the ends of the lever I is a third bifurcated portion or fork 32ª that is connected by means of a pivot pin 33 to a vertically-disposed rod 34, whose lower end portion is guided by a tubular member 35 on the bottom of the lubricant reservoir D. The upper end portion of the rod 34 projects into a bore formed in the lower end of the actuator L, previously referred to, that co-acts with the base flange of the rail to transmit movement from the rail to the lever I. The actuator L has a bracket 36 attached to same and a spring 37 is interposed between said bracket 36 and a co-operating bracket 38 that is rigidly fastened to the rod 34. The bore in the bracket 36 that receives the upper end portion of the rod 34 is so proportioned that the upper end of said rod never comes in contact with the end wall of said bore. Consequently, when the rail deflects downwardly under the weight of a passing load, the actuator L will move downwardly, this downward movement of the actuator will be transmitted by means of the spring 37 and the rod 34 to the lever I, with the result that the left hand end of said lever will move downwardly and the right hand end upwardly, thereby causing a charge of lubricant to be drawn into the cylinder of the pump F and also causing the lubricant aplying device C to be moved downwardly relatively to the rail head into such a position that the device C will not be struck by the flange of the wheel. As soon as the load is removed, the rail A moves upwardly, and the lever I returns to the position shown in Figure 1 under the influence of the spring M, thereby causing the charge of lubricant which previously was drawn into the pump cylinder to be forced upwardly through the conduit D and discharged from the ports I, and causing the lubricant applying device C to be restored to its normal position alongside the head of the rail. Any surplus or excess lubricant supplied to the space between the device C and the rail head and the inner wall of the guide member H to which it is opposed, escapes into the by-pass groove 1ª and thence into the internal space of the guide member H, finally being returned to the source of supply in the lubricant holder D when the carrier K moves downwardly during the succeeding cycle of operations of the apparatus.

The actuator L is provided at its upper end with an adjustable contact member 39 that is adapted to bear against the underside of the base flange of the rail and which can be set in different positions on the actuator L, so as to vary the stroke imparted to the lever I. The normal position of the lubricant applying device C relatively to the rail head can be accurately controlled or varied by changing the point of connection between the reciprocating element J and the tubular portion 7 on the carrier K to which said reciprocating element is detachably connected by the set screw or equivalent device 8. Preferably the conduit G is formed from flexible material so as to prevent it from being affected by the vertical movement of the rail. In order to make the lubricant reservoir D tight and prevent water, dirt and other foreign matter from entering the same, the top wall of said reservoir is provided with a stuffing box 40 in which the reciprocating element J slides, and a stuffing box 41 in which the actuator L slides, the guide member 22 on the top wall of the reservoir which receives the upper portion of the pump plunger 20 being equipped with a gasket 42, so as to eliminate the possibility of the lubricant escaping from the reservoir through the joint between said parts or permitting water, dirt or the like to enter the reservoir.

With a rail lubricating apparatus of the construction above described there is no liability of the lubricant being wasted or splashed or thrown around the parts of the structure other than the gage side of the rail head and the lubricant applying device C, owing to the fact that the lubricant is fed to the device C by means of a plurality of distributing ports 1 in the inner wall of the guide member H that are always overlapped by the device C, both when said device is in its normal elevated position, and when said device is in its depressed position. The quantity of lubricant that is supplied to the device C can be accurately controlled or regulated, and any excess lubricant that is fed to the device C will escape back to the source of supply in the reservoir D through the by-pass groove 1ª, a hollow internal space of the guide member H and the depending tubular portion 7 on the carrier K. The torsion spring 12 that is combined with the pintle pin of the lubricant applying device C insures said device remaining in proper spaced relation with the rail head, even after the gage side of the rail head has become worn, and the reciprocating movement that is imparted to the carrier K for the lubricant applying device, each time a load passes over the rail with which the apparatus co-operates, insures an adequate supply of lubricant being spread over the gage side of the rail head. The apparatus can be adjusted easily to adapt it to different sizes of rails or to compensate for wear of the parts of the apparatus, and when the apparatus is in use, there is no liability of any of the parts of same becoming strained, or injured by excessive deflection of the rail, due to the fact that the spring 37 which is interposed between the two brackets 36 and 38 will yield in the event the rod 34 moves downwardly far enough to strike against the end wall of the bore in the guide 35 in which it reciprocates. Such an apparatus is relatively inexpensive to build, as it is composed of parts of simple design; it is easy to install and maintain in operative condition, and as the lubricant reservoir of same is tight, there is no liability of water, dirt or other foreign matter becoming mixed with the source of supply of lubricant that is fed to the lubricant applying device C. While I have stated that the apparatus is preferably constructed in such a way that the deflection or downward movement of the rail is used to depress the lubricant applying device C and simultaneously cause a charge of lubricant to be drawn into the pump that is used to feed the lubricant to the point where it is used, I wish it to be understood that it is immaterial at what particular point in the cycle of operations of the apparatus the lubricant is fed to the lubricant applying device, as my broad idea consists of an apparatus constructed in such a manner that each time a car wheel passes over the rail with which the apparatus co-acts a quantity of lubricant will be automatically spread over the gage side of the rail head, either prior to or after the passage of the wheel, without liability of the lubricant being thrown or splashed around the track ties, road bed or exposed parts of the apparatus.

Having thus described my invention, what I claim as new and desire to secure by Letters Patent is:

1. A rail lubricating apparatus, comprising a lubricant applying device arranged out of the zone of travel of a passing wheel, means for supplying said device with a lubricant, and means for moving said device relatively to the rail in such a way as to spread the lubricant over the gage side of the rail head.

2. A rail lubricating apparatus provided with means operated by the deflection of the rail and arranged out of the zone of travel of a passing wheel for causing a lubricant to be automatically applied directly to the gage side of the head of the rail with which the apparatus is used each time a load passes over the rail.

3. A rail lubricating apparatus, comprising a lubricant applying device arranged at one side of the rail with which the apparatus is used, means for feeding a lubricant to the surface of said device that is arranged in opposed relation to the rail, and means for moving said device relatively to the rail so as to prevent said device from contacting with or engaging a passing wheel and also to cause the lubricant to be spread over the gage side of the rail head.

4. A rail lubricating apparatus, comprising a lubricant applying device arranged at one side of the rail with which the apparatus is used, means for feeding a lubricant to the surface of said device that is arranged in opposed relation to the rail, and means operated by the deflection of the rail incident to a passing load, for moving said device relatively to the rail in such a way as to prevent said device from being engaged by a passing wheel and also to cause the lubricant to be applied to the rail.

5. A rail lubricating apparatus, comprising a lubricant applying device normally arranged in proximity to the gage side of the rail head with which the apparatus is used, means for supplying a lubricant to said device, and means rendered operative by the deflection of the rail, produced by a passing load, for causing said device to move relatively to the rail in such a way as to move out of the path of a passing wheel and also to spread the lubricant over the gage side of the rail head.

6. A rail lubricating apparatus, comprising a lubricant applying device for spreading a lubricant over the gage side of the head of the rail with which the apparatus is used, a pump for feeding a lubricant to said device from a source of supply, and a mechanism rendered operative by the deflection of the rail incident to a passing load, for actuating said pump and for moving the lubricant applying device relatively to the rail.

7. A rail lubricating apparatus, comprising a lubricant applying device that is normally positioned at one side of the head of the rail with which the apparatus is used, means for feeding a lubricant to said device from a source of supply, means for causing said device to spread the lubricant over the rail without being engaged by a passing wheel, and means whereby excess lubricant will be returned from said device back to the source of supply.

8. A rail lubricating apparatus, comprising a lubricant applying device, means rendered operative by the passage of a load over the rail with which the apparatus is used for feeding a lubricant to said device, means for holding said device in yielding engagement with the part of the rail that is to be lubricated, and means for moving said device relatively to the rail so as to prevent said device from being engaged by a passing wheel and also to spread the lubricant over the rail.

9. A rail lubricating apparatus, comprising a lubricant applying device, a guide member arranged at one side of the rail, in which said device is reciprocatingly mounted, a carrier in said guide member for said device, a pump for feeding a lubricant to said device, and a means rendered operative by deflection of the rail incident to a passing load for operating said pump and for reciprocating said carrier.

10. A rail lubricating apparatus, comprising a lubricant applying device, a guide member arranged at one side of the rail, in which said device is reciprocatingly mounted, a carrier in said guide member for said device, a pump for feeding a lubricant to said device, a means rendered operative by deflection of the rail incident to a passing load, for operating said pump and for reciprocating said carrier, a space in said guide member in which excess lubricant supplied to said lubricant applying device can collect, and means for returning the lubricant from said collection space back to the source of supply of lubricant.

11. A rail lubricating apparatus, comprising a reciprocating carrier arranged at one side of the rail with which the apparatus is used, a lubricant applying device mounted on said carrier in such a way that said device normally laps over the gage side of the rail head, a lubricant reservoir positioned under the rail, a pump in said reservoir for feeding the lubricant to said applying device, and a mechanism in said reservoir rendered operative by a passing load, for actuating said pump and for actuating said carrier.

12. A rail lubricating apparatus, comprising a guide member adapted to be positioned at one side of the rail with which the apparatus is used, means for retaining said member in operative relationship with the rail, a vertically reciprocating carrier in said guide member, a lubricant applying device on said carrier arranged in opposed relationship with the opposed side of the head of the rail, means for holding said device in contact with the rail, a reservoir for holding a supply of lubricant, a pump for feeding the lubricant from the source of supply to said lubricant applying device, and means whereby deflection of the rail, incident to a passing load, reciprocates said carrier and causes said pump to feed a charge of lubricant to said applying device.

13. A rail lubricating apparatus, comprising a lubricant applying device arranged so that it normally extends along the gage side of the head of the rail with which the apparatus is used, a pump for feeding a lubricant to said device from a source of supply, and an adjustable mechanism rendered operative by a passing load, for actuating said pump and for moving said device relatively to the rail so as to spread the lubricant over the gage side of the rail head.

14. A rail lubricating apparatus, comprising a lubricant applying device normally positioned at one side of the head of the rail with which the apparatus is used, a guide member mounted on the rail, a reciprocating carrier in said guide member on which the applying device is yieldingly mounted, a lubricant reservoir arranged under the rail, a pump in said reservoir for feeding the lubricant from the reservoir to said applying device, and a mechanism rendered operative by deflection of the rail incident to a passing load, for actuating said pump and for reciprocating said carrier.

15. A rail lubricating apparatus, comprising a lubricant applying device adapted to co-act with the head of the rail, means for yieldingly holding said device in engagement with a rail head, means for causing said device to move upwardly and downwardly relatively to the rail head when a load passes over the rail to apply the lubricant to said head, and means for automatically supplying a lubricant to the device without liability of the lubricant being thrown or splashed over exposed parts of the structure.

16. A rail lubricating apparatus, comprising a member arranged at one side of the rail and provided with a plurality of distributing ports located under the head of the rail, means for feeding a lubricant to said ports, and an automatically operating means arranged out of the path of travel of a passing wheel for causing lubricant that is discharged from said ports to be spread over the gage side of the head of the rail automatically each time a load passes over the rail.

17. A rail lubricating apparatus, comprising a member arranged at one side of the rail and provided with a lubricant discharge portion that is located below the head of the rail, means for feeding a lubricant to said discharge portion from a source of supply, an automatically operating member that causes lubricant from said discharge portion to be spread over the gage side of the head of the rail, and means whereby excess lubricant from said discharge portion will be returned to the source of supply without escaping to the exterior of the apparatus.

18. A rail lubricating apparatus, comprising a guide member adapted to be connected to one side of a rail, a vertically reciprocating carrier mounted in said guide member, a spring-actuated lubricant applying device pivotally mounted on said carrier and arranged so that it normally is positioned oppositely the gage side of the rail head, a lubricant reservoir arranged under the rail, a pump in said reservoir for feeding lubricant from the reservoir to the surface of said applying device that is disposed oppositely to the gauge side of the rail head, a reciprocating element in the top wall of the lubricant reservoir provided with a center bore or opening, a tubular portion on said carrier connected to said reciprocating element and projecting into the center bore of same, a lever in said reservoir whose opposite end portions are pivotally connected to the plunger of said pump and said reciprocating element, a spring that exerts pressure on said lever in one direction, and an actuator adapted to be moved by the deflection of the rail for moving said lever in opposition to said spring.

ROBERT E. EINSTEIN.